(12) United States Patent
Tiedemann, Jr. et al.

(10) Patent No.: US 6,714,512 B2
(45) Date of Patent: Mar. 30, 2004

(54) METHOD AND APPARATUS FOR A DEDICATED CONTROL CHANNEL IN AN EARLY SOFT HANDOFF IN A CODE DIVISION MULTIPLE ACCESS COMMUNICATION SYSTEM

(75) Inventors: Edward G. Tiedemann, Jr., San Diego, CA (US); Abhijit G. Shanbhag, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 105 days.

(21) Appl. No.: 09/990,563

(22) Filed: Nov. 21, 2001

(65) Prior Publication Data

US 2002/0051483 A1 May 2, 2002

Related U.S. Application Data

(63) Continuation of application No. 09/317,666, filed on May 24, 1999, now Pat. No. 6,351,460.

(51) Int. Cl.[7] .................................................. H14Q 7/20
(52) U.S. Cl. ..................... 370/209; 370/335; 370/342; 455/442; 375/150
(58) Field of Search ................................ 370/209, 210, 370/311, 331, 332, 335, 341, 342, 320; 455/67.1, 67.4, 68, 450, 517, 422, 442, 566, 520, 562, 59, 69, 70; 375/130, 142, 150

(56) References Cited

U.S. PATENT DOCUMENTS

| 3,925,782 A | 12/1975 | Anderl et al. ............... 343/178 |
| 4,112,257 A | 9/1978 | Frost ............................... 179/2 |
| 4,123,718 A | 10/1978 | Lampert et al. ............ 325/474 |
| 4,222,115 A | 9/1980 | Cooper et al. ................. 375/1 |
| 4,225,976 A | 9/1980 | Osborne et al. ............. 455/226 |
| 4,495,648 A | 1/1985 | Giger ............................ 455/73 |
| 4,580,262 A | 4/1986 | Naylor et al. ................... 371/5 |
| 4,613,990 A | 9/1986 | Halpern ......................... 455/33 |
| 4,641,322 A | 2/1987 | Hasegawa ....................... 375/1 |
| 4,672,658 A | 6/1987 | Kavehrad et al. ............. 379/63 |
| 4,765,753 A | 8/1988 | Schmidt ....................... 379/60 |
| 4,777,653 A | 10/1988 | Bonnerot et al. ............. 455/69 |
| 4,811,421 A | 3/1989 | Havel et al. ................... 455/69 |

(List continued on next page.)

FOREIGN PATENT DOCUMENTS

WO          9835525          8/1998

OTHER PUBLICATIONS

TIA/EIA 95–B Standard "Mobile Station–Base Station Compatibility Standard for Wideband Spread Spectrum Cellular Systems" pgs. 6–380–6–381, 7–301–7–307, b–8 Feb. 1999.

*Primary Examiner*—Chi Pham
*Assistant Examiner*—Afsar M. Qureshi
(74) *Attorney, Agent, or Firm*—Philip R. Wadsworth; Kent D. Baker; S. Hossain Beladi (57) ABSTRACT

A method and apparatus for high data rate communication in a cellular/PCS communication system is provided. Specifically, the embodiment provides for early assignment of code channel for signaling channels (F-DCCH) in soft handoff. Thus, rather than simultaneously assigning a code channel for signaling data and another for traffic data for a particular Mobile Station (MS) in soft handoff, the code channel is assigned earlier for signaling data. Some of the unnecessary Base Station (BS) procedures with respect to the signaling data may be eliminated. An embodiment includes the concept of early signaling from the MS to request a code channel for signaling data, optionally followed by signaling (at a later time) from the MS to request a code channel for traffic data. This permits the MS to have the F-DCCH in soft handoff before having the F-DTCH (Forward Dedicated Traffic Channel) in soft handoff without requiring the BS to skip any of its procedures.

8 Claims, 3 Drawing Sheets

U.S. PATENT DOCUMENTS

| | | | |
|---|---|---|---|
| 4,868,795 A | 9/1989 | McDavid et al. | 367/77 |
| 4,870,698 A | 9/1989 | Katsuyama et al. | 455/67 |
| 4,901,307 A * | 2/1990 | Gilhousen et al. | 370/320 |
| 5,056,109 A * | 10/1991 | Gilhousen et al. | 370/342 |
| 5,093,840 A | 3/1992 | Schilling | 375/1 |
| 5,101,501 A | 3/1992 | Gilhousen et al. | 455/33 |
| 5,103,459 A | 4/1992 | Gilhousen et al. | 375/1 |
| 5,107,487 A | 4/1992 | Vilmur et al. | 370/18 |
| 5,109,390 A * | 4/1992 | Gilhousen et al. | 370/335 |
| 5,265,119 A | 11/1993 | Gilhousen et al. | 375/1 |
| 5,805,648 A | 9/1998 | Sutton | 375/367 |
| 6,351,460 B1 * | 2/2002 | Tiedemann, Jr. et al. | 370/332 |

* cited by examiner

METHOD AND APPARATUS FOR A DEDICATED CONTROL CHANNEL IN AN EARLY SOFT HANDOFF IN A CODE DIVISION MULTIPLE ACCESS COMMUNICATION SYSTEM

CROSS REFERENCE

This application is a continuation of U.S. application Ser. No. 09/317,666, filed May 24, 1999 now U.S. Pat. No. 6,351,460, entitled Method and Apparatus for a Dedicated Control Channel in an Early Soft Handoff in a Code Division Multiple Access Communication System and currently assigned to the assignee of the present application

BACKGROUND OF THE INVENTION

1. Field of the Invention

The present invention relates to digital wireless communication systems. More particularly, the present invention relates to a novel and improved method and apparatus for early soft handoff in a code-division multiple access (CDMA) communication system.

2. Description of the Related Art

In the field of wireless communications, several technology-based standards exist for controlling communications between a mobile station, such as a cellular telephone, Personal Communication System (PCS) handset, or other remote subscriber communication device, and a wireless base station. These include both digital-based and analog-based standards. For example, among the digital-based cellular standards are the Telecommunications Industry Association/Electronic Industries Association (TIA/EIA) Interim Standard IS-95 series including IS-95A, IS-95B and IS-95C (also known as CDMA2000) entitled "Mobile Station—Base Station Compatibility Standard for Dual-Mode Wideband Spread Spectrum Cellular System." Similarly, among the digital-based PCS standards are the American National Standards Institute (ANSI) J-STD-008 series, entitled "Personal Station—Base Station Compatibility Requirements for 1.8 to 2.0 GHz Code Division Multiple Access (CDMA) Personal Communication Systems." Other non-CDMA based digital standards include the time-division multiple access (TDMA) based Global System for Mobile Communications (GSM), and the U.S. TDMA standard TIA/EIA IS-54 series.

The spread spectrum modulation technique of CDMA has significant advantages over other modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", also assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

The aforementioned patents all describe the use of a pilot signal used for acquisition in a CDMA wireless communication system. At various times when a wireless communication device such as a cellular or PCS telephone is energized, it undertakes an acquisition procedure which includes, among other things, searching for and acquiring the pilot channel signal from a base station in the wireless communication system. For example, demodulation and acquisition of a pilot channel in a CDMA system is described in more detail in U.S. patent application Ser. No. 5,805,648, entitled "METHOD AND APPARATUS FOR PERFORMING SEARCH ACQUISITION IN A CDMA COMMUNICATION SYSTEM," assigned to the assignee of the present invention and incorporated herein by reference. When more than one pilot channel can be acquired by the wireless communication device, it selects the pilot channel with the strongest signal. Upon acquisition of the pilot channel, the wireless communication device is rendered capable of acquiring additional channels from the base station that are required for communication. The structure and function of these other channels is described in more detail in the above referenced U.S. Pat. No. 5,103,459 and will not be discussed in detail herein.

The above standards and patents describe, among other things, the manner in which a mobile station is to execute a "handoff" between neighboring base stations as it travels between their respective geographic coverage areas. For example, in the CDMA-based standards IS-95 and J-STD-008, the base station sends a message to the mobile station listing many of the system parameters of its neighboring base stations, including such information as would assist the mobile station in executing an "autonomous" handoff between base stations. An autonomous handoff is one that is not initiated or directed by the base station, but rather is initiated by the mobile station itself.

An example of one such neighbor list message is the "Extended Neighbor List Message" of J-STD-008. When the base station sends an Extended Neighbor List Message to the mobile station, it uses the format of Table I.

TABLE I

| Field | Length (bits) |
| --- | --- |
| MSG_TYPE ('00001110') | 8 |
| PILOT_PN | 9 |
| CONFIG_MSG_SEQ | 6 |
| PILOT_INC | 4 |

TABLE I-continued

| Field | Length (bits) |
|---|---|
| Zero or more occurrences of the following record: | |
| NGHBR_CONFIG | 3 |
| NGHBR_PN | 9 |
| SEARCH_PRIORITY | 2 |
| FREQ_INCL | 1 |
| NGHBR_BAND | 0 or 5 |
| NGHBR_FREQ | 0 or 11 |
| RESERVED | 0–7 (as needed) |

The above table is taken from Section 3.7.2.3.2.14 of J-STD-008, and indicates the various fields transmitted in an exemplary Extended Neighbor List Message. Of particular concern to the present invention are the following fields:

NGHBR_PN—the base station sets this field to the pilot PN sequence offset for this neighbor, in units of 64 PN chips; and NGHBR_FREQ—the base station sets this field to the CDMA channel number corresponding to the CDMA frequency assignment for the CDMA channel containing the paging channel that the mobile station is to search.

Thus, according to J-STD-008, the mobile station is given the frequency and PN offset of each neighboring base station. This gives the mobile station enough information to make a more focused search for neighbor pilots, rather than having to search all possible PN offsets on all possible CDMA frequency assignments. For example, the mobile station may keep a table of all the neighbors that were passed to it in the neighbor list message or extended neighbor list message. Such a table might resemble Table II below.

TABLE II

| PN Offset (chips) | Frequency |
|---|---|
| 12 | f(1) |
| 24 | f(1) |
| 48 | f(1) |
| 12 | f(2) |

With respect to "same-frequency neighbors," i.e. those that are on frequency f(1), the very nature of a CDMA modulation scheme allows a mobile station with a diversity receiver such as that described in the above-mentioned U.S. Pat. No. 5,109,390 to search for other pilot signals on the same frequency assignment, but having different PN offsets, while simultaneously continuing to demodulate any channel that it is already monitoring. In other words, a CDMA mobile station is typically able to search for the pilot signals of other base stations on the same frequency assignment, without interrupting transmission or reception of data with its original base station.

Current Cellular/PCS systems do not have the capability to handle large data transfers that occur in computing situations including internet environments. What is needed is a solution to carry large amounts of data in addition to voice.

SUMMARY OF THE INVENTION

An embodiment of the invention provides a method and apparatus for high data rate communication in a cellular/PCS communication system. Specifically, the embodiment provides for early assignment of code channel for signaling channels (F-DCCH) in soft handoff. Thus, rather than simultaneously assigning a code channel for signaling data and another for traffic data for a particular Mobile Station (MS) in soft handoff, the code channel is assigned earlier for signaling data. Some of the unnecessary Base Station (BS) procedures with respect to the signaling data may be eliminated. An embodiment includes the concept of early signaling from the MS to request a code channel for signaling data, optionally followed by signaling (at a later time) from the MS to request a code channel for traffic data. This permits the MS to have the F-DCCH in soft handoff before having the F-DTCH (Forward Dedicated Traffic Channel) in soft handoff without requiring the BS to skip any of its procedures.

DETAILED DESCRIPTION OF THE PREFERRED EMBODIMENTS

Figure 1:
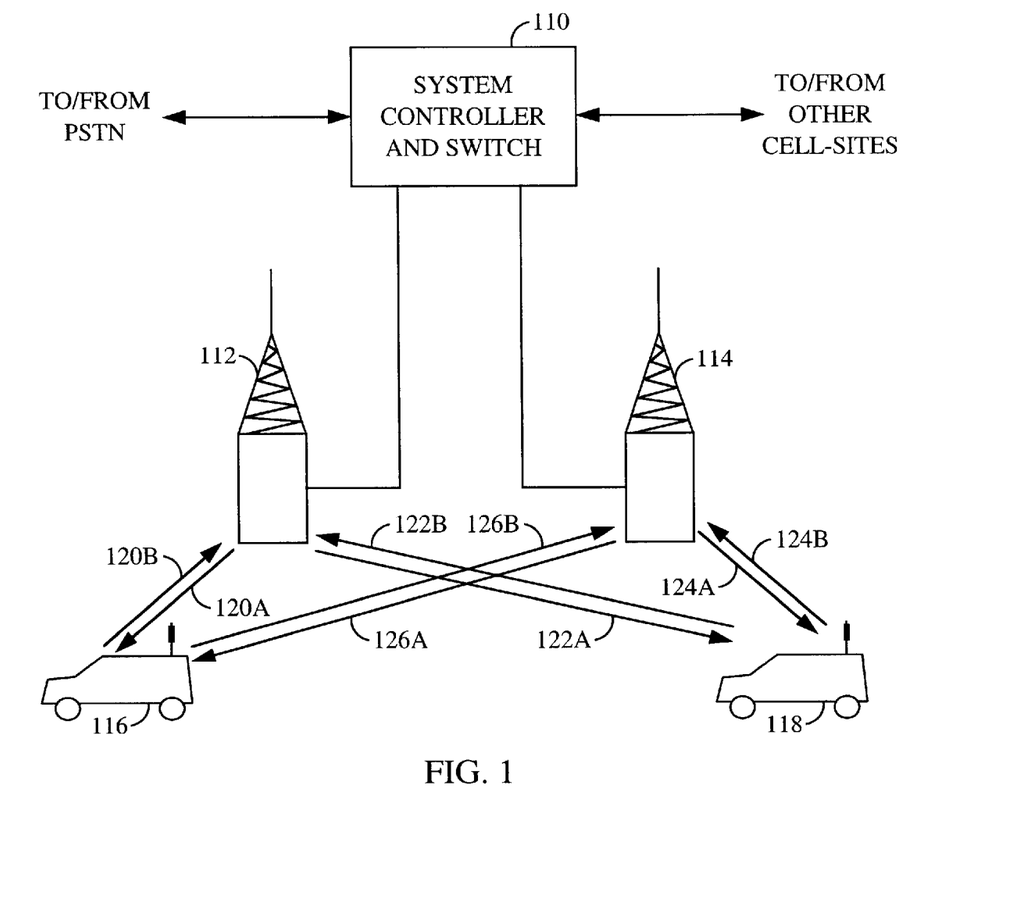
FIG. 1 illustrates a representative system in which an embodiment of the present invention resides.

Referring to FIG. 1, system controller and switch 110, also referred to as a mobile telephone switching office (MTSO), typically includes interface and processing circuitry for providing system control to the cell-sites. Controller 110 also controls the routing of telephone calls from a public switched telephone network (PSTN) to an appropriate cell-site for transmission to an appropriate mobile or subscriber unit. Controller 110 also controls the routing of calls from the mobile or remote subscriber units, using at least one cell-site, to the PSTN. Controller 110 may connect or link calls between subscriber users using the appropriate base stations since the subscriber units do not typically communicate directly with one another.

Controller 110 may be coupled to the cell-sites by various means such as dedicated telephone lines, optical fiber links, or microwave communication links. In FIG. 1, two such exemplary cell-sites 112 and 114 are shown along with mobile units 116 and 118, where each mobile unit includes a cellular telephone. Exemplary cell-sites 112 and 114, as discussed herein and as illustrated in the drawings, are considered as providing service to an entire cell. However, it should be understood that a cell may be geographically divided into sectors with each sector providing service to a different coverage area. Accordingly, handoffs are generally required to be made between sectors within a cell, while diversity may also be achieved between sectors as is done between cells.

In FIG. 1, lines 120a–120b and 122a–122b, along with their respective arrowheads, correspond to signal transmission, which includes data transmission over various traffic channels, between cell-site 112 and mobile units 116 and 118, respectively. Similarly, lines 124a–124b and 126a–126b represent communication between cell-site 114 and mobile units 118 and 116, respectively. Cell-sites 112 and 114 nominally transmit using equal power.

The coverage of cell-site service areas or cells is designed or laid out in geographic shapes such that the mobile units will normally be closest to one cell-site, and within only one sector if cell is divided into sectors. When the mobile unit is idle, i.e. no calls in progress, the mobile unit constantly monitors pilot signal transmissions from each nearby cell-site, and, if applicable, from a single cell-site if the cell is sectorized. Mobile unit 116 can determine which cell it is in by comparing signal strength for pilot signals transmitted from cell-sites 112 and 114.

In the example illustrated in FIG. 1, mobile unit 116 may be considered closest to cell-site 112. When mobile unit 116 initiates a call, a control message is transmitted to the nearest cell-site, here cell-site 112. Cell-site 112, upon receiving the call request message, transfers the called number to system controller 110. System controller 110 then connects the call through the PSTN to the intended recipient.

Should a call be initiated within the PSTN, controller 110 transmits the call information to all of the cell-sites in the area. The cell-sites in return transmit a paging message within each respective coverage area that is intended for the called recipient mobile user. When the intended recipient mobile unit "hears" or receives the page message, it responds with a control message that is transmitted to the nearest cell-site. This control message signals the system controller that this particular cell-site is in communication with the paged mobile unit. Controller 110 then routes the call through this cell-site to the mobile unit. Should mobile unit 116 move out of the coverage area of the initial cell-site, 112, an attempt is made to continue the call by routing the call through another cell-site.

In the exemplary system of FIG. 1, orthogonal Walsh functions are assigned to user channels on the cell-to-subscriber link. In the case of voice channels, the digital symbol stream for each voice signal is multiplied by its assigned Walsh sequence. The Walsh coded symbol stream for each voice channel is then multiplied by the outer PN coded waveform. The resultant spread symbol streams are then added together to form a composite waveform. Another embodiment of the present invention includes assigning orthogonal Walsh functions on the subscriber-to-cell link.

The resulting composite waveform is then modulated onto a sinusoidal carrier, bandpass filtered, translated to the desired operating frequency, amplified and radiated by the antenna system. Alternate embodiments of the present invention may interchange the order of some of the operations just described for forming the cell-site transmitted signal. For example, it may be preferred to multiply each voice channel by the outer PN coded waveform and perform the filter operation prior to summation of all the channel signals which are to be radiated by the antenna. It is well known in the art that the order of linear operations may be interchanged to obtain various implementation advantages and different designs.

The waveform design of the preferred embodiment for cellular service uses the pilot carrier approach for the cell-to-subscriber link, as is described in U.S. Pat. No. 4,901,307. All cells transmit a pilot carrier using the same 32,768 length sequence, but with different timing offsets to prevent mutual interference.

As is described in greater detail below, the symbol stream for a particular cellular user is combined in a first exclusive OR operation with the Walsh sequence assigned to that user. The Walsh function is typically clocked at a rate of 1.2288 MHz, 3.6864 MHz or 4.096 MHz while in an exemplary variable data rate system including voice, facsimile (FAX), and high/low-speed data channels the information symbol rate may vary from approximately 75 Hz to 76,800 Hz. The resulting coded waveform is combined in a second exclusive OR operation with a binary PN sequence also clocked at 1.2288 MHz. Another embodiment of the present invention includes a clock sequence in the range of 3–5 Mhz or above. Specifically, a preferred embodiment includes the rates of 3.6864 Mhz and 4.096 Mhz. An identical binary PN sequence is used to encode each subscriber channel within a particular sector of the coverage area of the cellular system. As a consequence of the orthogonality of the Walsh coding sequences, each sequence may be used to process user data on a single RF channel associated with such a sector without inducing interference among the users within the sector.

Prior to application of Walsh coding, the signals carried by each channel may also be convolutional or Turbo encoded, with repetition, and interleaved in order to provide error detection and correction functions which allow the system to operate at a much lower signal-to-noise and interference ratio. Techniques for convolutional or Turbo encoding, repetition, and interleaving are well known in the art. The resulting signals are then generally modulated onto an RF carrier and summed with the pilot and setup carriers, along with the other voice carriers. Summation may be accomplished at several different points in the processing such as at the IF frequency, or at the baseband frequency either before or after multiplication by the PN sequence associated with the channels within a particular cell.

Each voice/data carrier may also be multiplied by a value that sets its transmitted power relative to the power of the other voice carriers. This power control feature allows power to be allocated to those links that require higher power due to the intended recipient being in a relatively unfavorable location. Means are provided for the subscribers to report their received signal-to-noise ratio to allow the power to be set at a level that provides for adequate performance without wasting power. The orthogonality property of the Walsh functions is not disturbed by using different power levels for the different voice carriers provided that time alignment is maintained.

A preferred embodiment of the present invention includes coherent demodulation and fast power control of both the forward and reverse links. Optionally, the preferred embodiment may be, but need not be, backwards compatible with IS-95 series of related standards.

Figure 2:
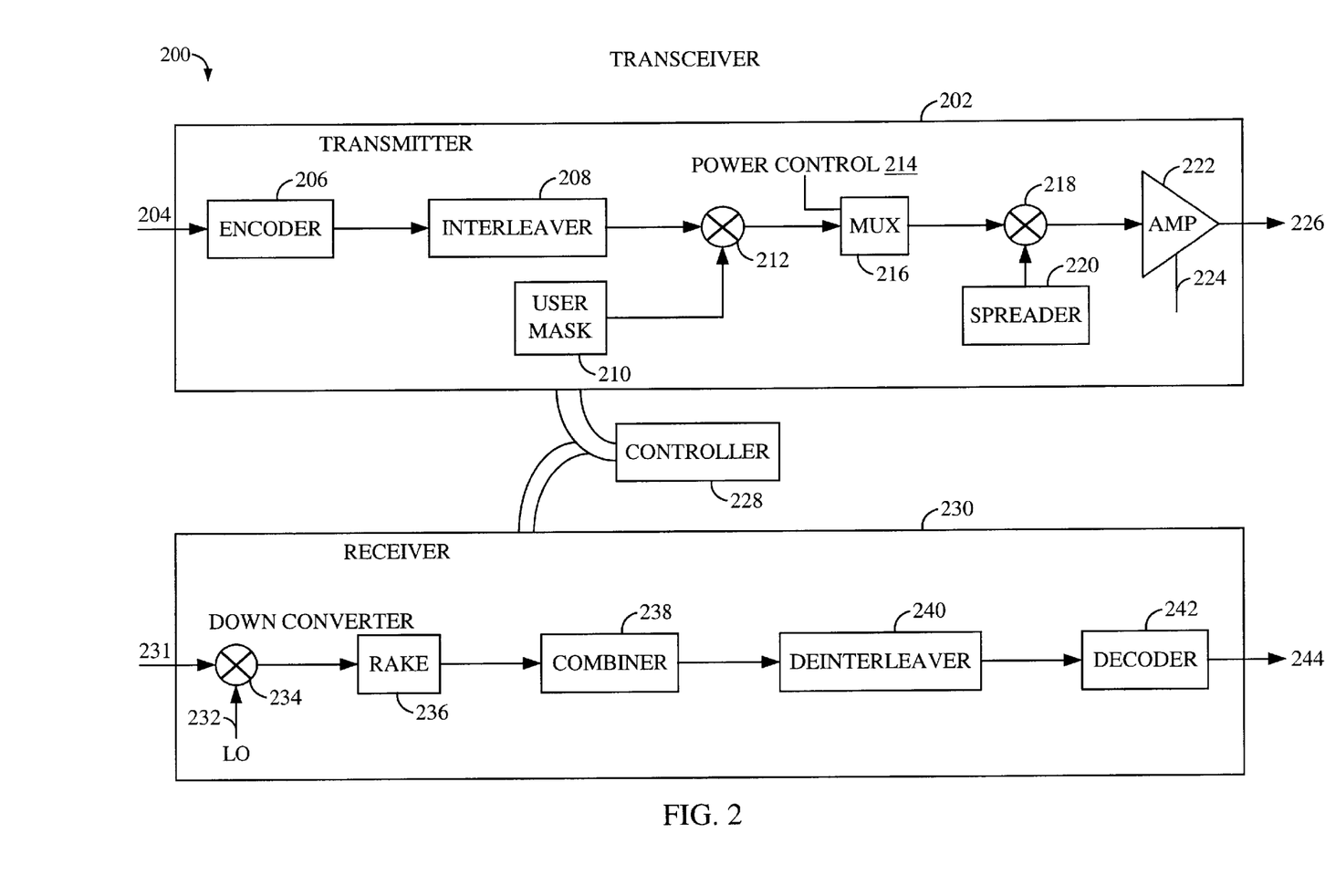
FIG. 2 illustrates a functional block diagram of a Code Division Multiple Access system transceiver.

Turning now to FIG. 2, a transceiver in an embodiment of the present invention is illustrated. The transceiver may be a mobile station or an essentially fixed external (base) station. Input data 204 typically includes a vocoded voice or data signal. The signal is then convolutionally encoded in encoder 206 where redundant information bits are added for forward error correction. The resultant data signal is then directed into interleaver 208 where the signal is then interleaved through time diversity to reduce the effect of fast fading on the signal at the eventual receiver. The interleaved signal is combined in mixer 212 with a user mask 210 at a frequency of interest decimated to a lower frequency, typically 19.2 kbps for identification purposes. In a preferred embodiment, the frequency of interest is selected from (although not restricted to) a range of frequencies between 1 MHz and 5 MHz, but is preferably 1.2288 MHz, 3.6864 MHz or 4.096 MHz.

The signal output from mixer 212 is optionally combined in mux 216 with a power control signal 214 that is punctured into the signal before being sent to mixer 218. In mixer 218 the signal is combined with a signal from spreader 220 at a frequency of interest as above, which in the preferred embodiment of the invention is of the same frequency, though it need not be. Spreader 220 contains a Walsh code generator operating at the frequency of inter The resultant signal is sent to amplifier 226 whose power output level is controlled by controller 228 by way of power control signal input 224. Controller 228 is shown as attached to both receiver and transmitter, however the forward and reverse links optionally may be symmetrical in some implementations of the preferred embodiments. Transceiver 200 is located at both a base station and a mobile station, but is programmed differently depending on the implementation.

Spreader 220 may be similar to that found in a forward or reverse link as described in IS-95. Specifically, the forward link and also reverse link may use orthogonal Walsh codes to separate the different user channels, or alternatively, different channels for the same user. An embodiment of the invention uses orthogonal Walsh codes to separate the different user channels instead of using the Walsh encoding to reduce intersymbol interference. Additionally, the reverse (mobile-to-base station) link optionally utilizes coherent demodulation at the external base station.

Additionally, since both the reverse and forward links in an embodiment of the invention utilize coherent demodulation, transceiver 200 may be located within the mobile station and/or the external base station.

At the receiver 230, input signal 231 arrives at downconverter mixer 234 where it is combined with variable local oscillator 232. A multi stage downconversion apparatus and process are illustrated in a single stage for simplicity. The downconverted signal is passed to RAKE receiver 236 for coherent demodulation of various received multipath signals. The received signals are then passed to combiner 238 where the signals are added in phase before being passed to deinterleaver 240. The signal is then sent to decoder 242 and the final output signal 244 is passed from receiver 230. Controller 228 contains all the functionality required to control both receiver 230 and transmitter 202.

IS-95C Forward Link—Dedicated Control Channel Characteristics

A Forward Link Dedicated Control Channel (F-DCCH) in IS-95C facilitates transmission of the user-specific signaling messages from the Base Station (BS) to the Mobile Station (MS) while reducing potential disruption to the user traffic. User-specific signaling messages are necessary to maintain the radio link between the MS and the BS (e.g., handoff direction messages) and, in addition, for the management of Media Access Control (MAC) issues related to the user. Further, information exchanges from BS to MS on the F-DCCH are needed even when no communication is in progress.

Usually for voice services the frequency of signaling data may be low. Due to the low signaling activity, the TIA/EIA-95 standard permits the BS to multiplex this signaling data with the user traffic frames using the methods of dim-and-burst and blank-and-burst mechanisms. Clearly, these methods work well if the information data is not required to be transmitted in real time or if the service quality could tolerate some degradation. For real time services such as video and motion image data, this method suffers from degradation of service quality. Furthermore, if the signaling data occurs frequently as may be the case for a variety of services such as multimedia services, this problem becomes more severe. IS-95C supports a rather sophisticated MAC layer primarily for packet data and multimedia services. In this case, a large amount of signaling data in the form of MAC messages are expected to be transmitted between the BS and the MS.

A preferred embodiment of the invention provides the capability for the physical channel to signal data separate from the physical channel for traffic data when the MS operates in certain predetermined modes. The physical channel which carries this signaling (or control) data is referred to as the F-DCCH (Forward Dedicated Control Channel). Two methods are considered. One is a common physical channel for signaling data is shared by multiple MS's. The other method is to assign a dedicated physical channel for signaling data for each MS. The former method makes more efficient use of the Walsh code resources. However, with the latter method, the delay incurred by the dedicated signaling data is smaller, especially when the volume of signaling data from the BS to the MS is large. In addition, no complex scheduling algorithm is required with the second method. Further, when the user operates in certain modes such as the "P2" mode of operation for basic packet data service, the forward link continuity and outer-loop power control are maintained by the F-DCCH, and so the F-DCCH becomes unsharable in this mode. As a result, the second approach is supported in IS-95C.

It should be noted that if the signaling data is always transmitted in the physical layer on the F-DCCH regardless of whether it is valid or not in the link layer, then capacity due to invalid signaling data is wasted. To make use of the system capacity efficiently, the signaling activity may be exploited. That is, when signaling data is invalid or does not exist in the link layer, its power is removed from the signaling channel, i.e., discontinuous transmission (DTX) is employed in IS-95C.

The F-DCCH optionally may be used in soft handoff mode. If MAC messages are transmitted on the F-DCCH in a certain service mode, the control of MAC is centralized if the F-DCCH is employed in soft handoff mode, otherwise, MAC control is distributed when not in soft handoff mode.

IS-95C F-DCCH Information

The signaling data carried by the IS-95C F-DCCH corresponding to different modes and services are given below.

In the "V1" mode for voice services, the F-DCCH is not used.

In the "V2" mode for voice services, the Upper Layer Signaling frames (General Handoff Direction Message, In-Traffic Systems Parameters Message, Neighbor List Update Order. Local Control Order, etc.) are sent on the F-DCCH.

In the "P1" mode for packet data service, the F-DCCH is not used.

In the "P2" mode for packet data service, the Upper Layer Signaling messages and MAC messages are sent on the F-DCCH.

In the "P3" mode for packet data service, the MAC messages are sent on the F-DCCH.

In the "VP1" mode for concurrent voice and packet data service, the F-DCCH is not used.

In the "VP2" mode for concurrent voice and packet data service, the Upper Layer Signaling messages and MAC messages are sent on the F-DCCH.

To support the mixing of MAC signaling with RLP frames or Upper Layer Signaling information, the F-DCCH supports dual frame size operation (5 and 20 ms).

Basic TIA/EIA-95, TIA/EIA-95-B Soft Handoff Procedures

IS-95 specifies the procedures for a MS to send a Pilot Strength Measurement Message (PSMM) to the Base Station based on a set of fixed thresholds, i.e. T_ADD, T_DROP and T_COMP. The PSMM from the MS to the BS is triggered as pilots cross such thresholds. In particular, the MS sends a PSMM when it finds a pilot of sufficient strength (i.e., pilot strength exceeding T_ADD) which is not in the Active Set (i.e., the pilots associated with the Forward Traffic Channels being demodulated by the MS) of the MS. From the BS viewpoint, the PSMM is a request from the MS to add the new pilot in its active set. The BS on receiving the PSMM may use some algorithm (using the reported pilot strengths) to decide on whether the Active Set pilots should be changed for soft handoff.

Since it was observed based on field data that excessive soft/softer handoff in an IS-95 system has negative impact on system capacity and network resources, several changes were made to the soft handoff procedures in TIA/EIA-95-B standard to improve performance. The improved soft handoff (ISH) feature specified in TIA/EIA-95-B is intended to reduce the percentage of time that the MS is in soft handoff without impacting the system performance. The principal benefit of the ISH feature is, thus, to reduce unnecessary handoff legs so as to improve efficiency in both capacity and resource allocation due to soft handoff.

In TIA/EIA-95-B, the ISH feature enables the MS to use dynamic thresholds, which the pilot strengths of new pilots need to cross, based on the combined pilot strength of the current Active Set pilots as a trigger to send the PSMM to the BS. Specifically, the MS sends a PSMM (add pilot request) when the pilot strength (PS) of any pilot in the Neighbor Set or Remaining Set satisfies:

$$10 \times \log_{10} PS > \max\left(\frac{SOFT\_SLOPE}{8} \times 10 \times \log_{10} \sum_{i \in A} PS_i + \frac{ADD\_INTERCEPT}{2}, \frac{T\_ADD}{2}\right)$$

where the summation is performed over all pilots currently in Active Set; SOFT_SLOPE, ADD_INTERCEPT are BS configurable parameters (sent by BS to MS in certain Overhead or Traffic Channel Messages). Thus, this feature enables the MS to screen candidate pilots before sending in a request for adding them to or removing them from the Active Set based on the combined pilot strength of the Active Set pilots. The quantity on the RHS of the above inequality will be denoted by T_dyn_ADD.

Current IS-95/IS-95-B Performance

For IS-95/IS-95B systems, unlike most other messages, reliable reception of the Handoff Direction Message (HDM) by the mobile is critical. In many cases the HDM is the weakest link in a call; failure of the mobile to receive the HDM can result in a dropped call.

In particular, one of the problem areas in IS-95/IS-95-B based systems has been the fast rising pilot scenario. In this scenario, the MS detects a fast rising pilot which does not belong to its Active Set and sends a PSMM to the BS. The BS processes this request from the MS and after some latency sends a Handoff Direction Message. However, during this time, the pilot strength of the new pilot may have significantly risen and the resulting interference may be extremely serious. This may cause the MS to lose the Handoff Direction Message sent by the BS, and may eventually result in a dropped call. Clearly a scheme which increases the reliability with which the MS receives the Handoff Direction Message from the BS can significantly reduce the call drop probability in such scenarios.

Controlling Early Code Channel Assignment

Figure 3:
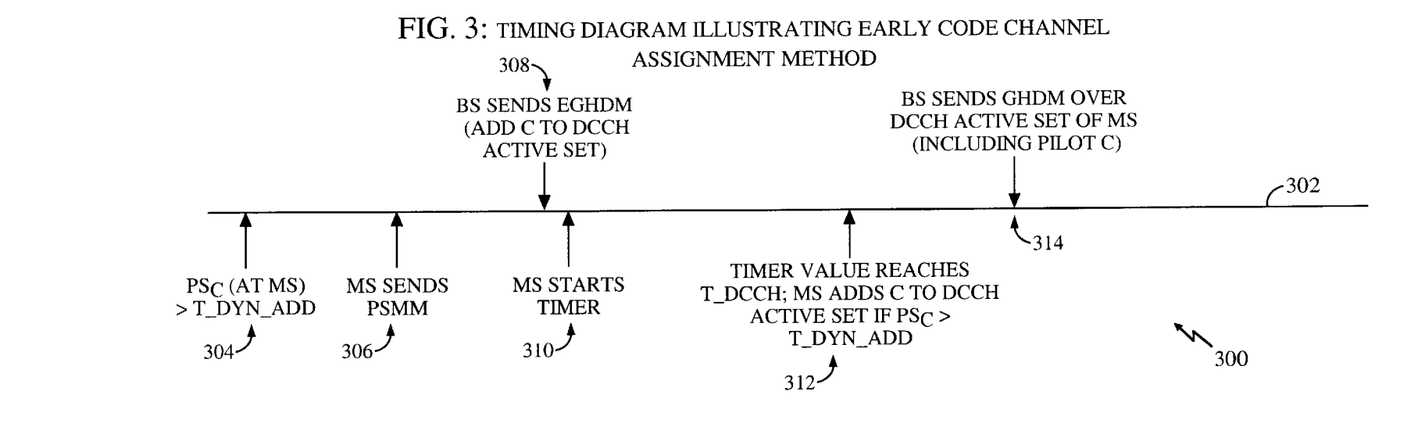
FIG. 3 illustrates a timeline representing the methodology of an embodiment of the present invention.

In the Early Code Channel Assignment embodiment illustrated in FIG. 3, the BS 112 processes the PSMM from the MS 116 and speedily assigns a Walsh code channel for the F-DCCH so that the MS 116 can use the F-DCCH in soft handoff as soon as possible. The BS 112 assigns a Walsh function to the MS 116. The F-DCCH is in soft handoff mode prior to assignment of the Walsh function for the F-DTCH, which is already in soft handoff for the same MS. This speedy assignment of the Walsh function for the F-DCCH vis-a-vis the F-DTCH is carried out by skipping some of the BS procedures which may be unnecessary with respect to the signaling data carried by the F-DCCH. For example, on receiving the PSMM from the MS 116, the BS 112 optionally may assign a Walsh function to the MS 116 at a new sector/cell A (not shown) for the F-DCCH unconditionally, thus skipping most of the selector processing of the PSMM.

The assigned Walsh function for the F-DCCH in a new cell/sector A may be conveyed by the BS 112 to the MS 116 via the new Early General Handoff Direction Message (EGHDM) in step 308 of the timeline. From the MS 112 point of view, the early F-DCCH channel assignment is simply a recommendation to start reception of the messages (such as GHDM) carried by the F-DCCH on the specified code channel. It is desirable for the BS to convey a time interval T_dcch to the MS 112 in the EGHDM. The Miss. 112 begins a timer on receiving the EGHDM in step 310. As soon as the timer value exceeds T_dcch in step 312, the MS 112 measures the pilot strength Ec/Io of the pilot A (not shown). At this time, if the pilot strength of the pilot A exceeds the appropriate soft handoff threshold in IS-95B, the MS begins to use the pilot A in its Active Set for the F-DCCH. Alternatively, if the pilot strength of the pilot A is below the appropriate soft handoff threshold in IS-95B, the MS does not add the pilot A in its Active Set for the F-DCCH. The timing diagram in FIG. 3 further illustrates this technique by denoting C as a (strong) Neighbor Set pilot of a MS with pilot strength (in dB) $PS_c$ in step 314.

Another embodiment is to reserve a code channel for the F-DCCH in a cell/sector for each MS 112 in a neighboring sector. This code channel reservation scheme is based on predetermined parameters specific to the MS (and optionally cell).

Controlling Early Signaling from MS

Figure 4:
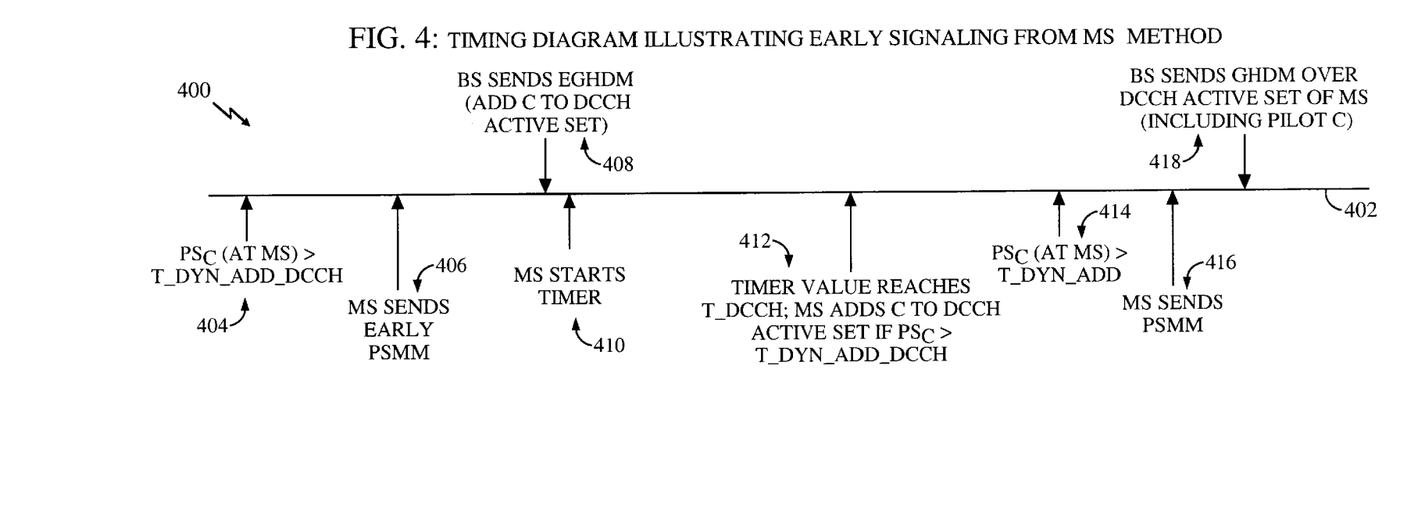
FIG. 4 illustrates a timeline representing the methodology of another embodiment of the present invention.

Referring now to FIG. 4, in the Early Signaling from MS embodiment, the pilot signal at the MS 116 is measured in step 404. The MS 116 sends an early PSMM to the BS 112 primarily as a request from the MS 116 to the BS 112 to add a new pilot A in its Active Set for the F-DCCH in step 406. This optionally is followed by another PSMM at a later time as a request from the MS to the BS to add the pilot A in its Active Set for the F-DTCH as well. Thus, the MS 116 is enabled to have the F-DCCH at the new pilot in soft handoff as soon as possible for reliable reception of signaling data from the BS 112.

The soft handoff improvements introduced in IS-95B are directed in part to increase capacity when data rates may be high on the forward link (FL). However, the message rate on the F-DCCH may be significantly lower than the data rate on the traffic channel. Thus, having the signaling channel in early soft handoff may not impact FL capacity significantly. Further, it should be noted that having the F-DTCH at the new pilot in soft handoff right after Early Signaling from MS may be inefficient if a code channel is allocated when not necessary.

Several options exist to have the MS transmit early PSMM signaling to have the F-DCCH in early soft handoff. One embodiment is by manipulating the IS-95B soft handoff parameters or even the soft handoff procedure itself. An example of one such example is given next.

The BS includes a new ADD_INTERCEPT_dcch field in the Extended System Parameters Message (ESPM) and in the Handoff Direction Messages (such as GHDM) in addition to the ADD_INTERCEPT field as described earlier. The MS 112 sends a PSMM (add pilot for F-DCCH request) when the pilot strength (PS) of any pilot in the Neighbor Set or Remaining Set satisfies:

$$10 \times \log_{10} PS >$$

$$\max\left(\frac{SOFT\_SLOPE}{8} \times 10 \times \log_{10} \sum_{i \in A} PS_i + \frac{ADD\_INTERCEPT\_dcch}{2}, \frac{T\_ADD}{2}\right)$$

where the summation is performed over all pilots currently in Active Set; SOFT_SLOPE, ADD_INTERCEPT are BS configurable parameters (sent by BS to MS in certain Overhead or Traffic Channel Messages). The quantity on the RHS of the above inequality will be denoted by T_dyn_ADD_dcch as in step 404. By having ADD_INTERCEPT_dcch<ADD_INTERCEPT the MS 112 may send an early PSMM signal requesting the BS 116 to add the new pilot in its Active Set for the F-DCCH as in step 406.

Again, the assigned Walsh function for the F-DCCH in a new cell/sector A may be conveyed by the BS 116 to the MS 112 via the EGHDM message in step 408. Again, the BS may convey a time interval T_dcch to the MS in the EGHDM and the MS begins a timer on receiving the EGHDM in step 410. When the timer value exceeds T_dcch in step 412, the MS 116 measures the pilot strength Ec/Io of the pilot A. In step 414, if the pilot strength of the pilot A exceeds the above dynamic soft handoff threshold (using ADD_INTERCEPT_dcch as above), the MS 116 begins to use the pilot A in its Active Set for the F-DCCH. Alternatively, if the pilot strength of the pilot A is below the above soft handoff threshold in IS-95B, the MS does not add the pilot A in its Active Set for the F-DCCH. Denoting C as a (strong) Neighbor Set pilot of a MS with pilot strength $PS_c$ (in dB). In step 416, the MS 116 sends a PSmm while in step 418 BS 112 sends a GHDM over DCCH.

Advantageously, no internal Base Station procedure need be skipped if the Early Signaling from MS method is used in contrast to the case when the Early Code Channel Assignment method was used.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of initiating a handoff in a wireless communication system among a mobile station and a plurality of cells, comprising the steps of:

transmitting a first pilot strength measurement message from a mobile station to a base station;

assigning a Walsh code channel for a first forward link dedicated control channel;

assigning a Walsh function to the mobile station to provide early soft handoff capability to a first forward dedicated traffic channel; and transmitting a first message type (eghdm) from a base station to a mobile station containing information to start reception by the mobile station on the forward dedicated control channel of said first message.

2. A method of initiating a handoff in a wireless communication system among a mobile station and a plurality of base stations, comprising the steps of:

transmitting a first pilot strength measurement message from a mobile station to a base station to add a new pilot to its active set for a forward data control channel; and optionally transmitting at least one additional pilot strength measurement signal from the mobile station to the base station to add a pilot to its active set for a forward dedicated traffic channel.

3. The method of claim 2 further including the step of:

adding a field in a first message (ESPM) and second message (GHDM) when a measured pilot strength in a predetermined group exceeds a calculated threshold.

4. The method of claim 3 wherein said predetermined group is one of neighbor set and remaining set.

5. An apparatus for initiating a handoff in a wireless communication system among a mobile station and a plurality of cells, comprising:

means for transmitting a first pilot strength measurement message from a mobile station to a base station;

means for assigning a Walsh code channel for a first forward link dedicated control channel;

means for assigning a Walsh function to the mobile station to provide early soft handoff capability to a first forward dedicated traffic channel; and means for transmitting a first message type (eghdm) from a base station to a mobile station containing information to start reception by the mobile station on the forward dedicated control channel of said first message.

6. An apparatus of initiating a handoff in a wireless communication system among a mobile station and a plurality of base stations, comprising:

means for transmitting a first pilot strength measurement message from a mobile station to a base station to add a new pilot to its active set for a forward data control channel; and means for optionally transmitting at least one additional pilot strength measurement signal from the mobile station to the base station to add a pilot to its active set for a forward dedicated traffic channel.

7. The apparatus of claim 6 further including:

means for adding a component to a first message (ESPM) and second message (GHDM) when a measured pilot strength in a predetermined group exceeds a calculated threshold.

8. The apparatus of claim 7 wherein said predetermined group is one of neighbor set and remaining set.

* * * * *